(12) United States Patent
Berioli

(10) Patent No.: US 12,461,870 B2
(45) Date of Patent: Nov. 4, 2025

(54) AIRCRAFT PERSONALITY MODULE ON SD CARD

(71) Applicant: SAFRAN PASSENGER INNOVATIONS, LLC, Brea, CA (US)

(72) Inventor: Matteo Berioli, Munich (DE)

(73) Assignee: Safran Passenger Innovations, LLC, Brea, CA (US)

( * ) Notice: Subject to any disclaimer, the term of this patent is extended or adjusted under 35 U.S.C. 154(b) by 0 days.

(21) Appl. No.: 17/837,199

(22) Filed: Jun. 10, 2022

(65) Prior Publication Data

US 2022/0398203 A1 Dec. 15, 2022

(30) Foreign Application Priority Data

Jun. 10, 2021 (EP) ..................................... 21178794

(51) Int. Cl.
*G06F 13/20* (2006.01)
*H01Q 1/28* (2006.01)
*H01Q 21/28* (2006.01)

(52) U.S. Cl.
CPC ...... *G06F 13/20* (2013.01); *G06F 2213/3808* (2013.01)

(58) Field of Classification Search
CPC .......................... H04B 7/0408; H04B 7/18508
See application file for complete search history.

(56) References Cited

U.S. PATENT DOCUMENTS

| 6,192,416 | B1 | 2/2001 | Baxter | |
| 10,566,683 | B1* | 2/2020 | Campbell | H01Q 3/36 |
| 11,211,695 | B1* | 12/2021 | Paulsen | H04B 7/0408 |
| 2007/0027589 | A1* | 2/2007 | Brinkley | G08G 5/0013 |
| | | | | 701/3 |
| 2019/0191334 | A1* | 6/2019 | Montsma | H04W 28/082 |
| 2020/0076496 | A1 | 3/2020 | McGuffin | |
| 2020/0410874 | A1 | 12/2020 | Jensen | |
| 2021/0282152 | A1* | 9/2021 | Sánchez García Viedma | |
| | | | | H04W 72/30 |
| 2022/0210792 | A1* | 6/2022 | Korada | H04B 7/2041 |

FOREIGN PATENT DOCUMENTS

EP      3 796 572 A1    3/2021

OTHER PUBLICATIONS

European Search Report mailed Dec. 10, 2021, issued in corresponding European Application No. 21178794.0, filed Jun. 10, 2021, 10 pages.

* cited by examiner

*Primary Examiner* — Getente A Yimer
(74) *Attorney, Agent, or Firm* — CHRISTENSEN O'CONNOR JOHNSON KINDNESS PLLC

(57) ABSTRACT

A MODMAN modem manager unit in an aviation broadband satellite terminal has a media interface slot integrated into the MODMAN. The media interface slot is exclusively dedicated to interface an external storage device. The external storage device is configured to be attached to or removed from the dedicated media interface slot, and the dedicated media interface slot is configured to allow transfer and storage of instructions and data specific for an APM Aircraft Personality Module via said dedicated media interface slot onto an attached external storage device. When interacting with the MODMAN via the dedicated media interface slot, the attached external storage device is configurable to act as dedicated APM in said aviation broadband satellite terminal.

8 Claims, 3 Drawing Sheets

ARINC791

ARINC792

AIRCRAFT PERSONALITY MODULE ON SD CARD

CROSS-REFERENCE TO RELATED APPLICATION

This application claims priority to EP 21178794.0, filed Jun. 10, 2021, the disclosure of which is hereby expressly incorporated by reference herein in its entirety.

TECHNICAL FIELD

The disclosed subject matter can in particular be used in Aircraft connectivity for In-Flight Connectivity (IFC) systems based on ARINC 791 and 792, Aircraft Earth Station (AES) systems.

BACKGROUND

This present disclosure relates to the field of Internet connectivity for aircraft, and in particular to the design of a broadband satellite terminal according to the ARINC 791 and 792 standards. Such an aviation broadband satellite terminal is normally referred to as "Aircraft Earth Station (AES)".

Prior art broadband satellite terminals according to the ARINC 791 and 792 standards are schematically shown in FIGS. 3 and 4, respectively. Variations of the ARINC 791 and 792 architectures are possible, a proprietary variant of a known AES is shown in FIG. 5.

ARINC791 defines specifications for an airborne broadband Very Small Aperture Terminal (VSAT) utilizing commercial Ku-band or Ka-band satellite transponders.

The ARINC791 AES system shown in FIG. 3 comprises five Line-Replaceable Units (LRUs), namely
  MODMAN (Modem Manager)
  APM (Airplane Personality Module)
  KRFU (Ku/Ka-band Radio Frequency Unit))
  KANDU (Ku/Ka-band Aircraft Networking Data))
  FMA (Fuselage-Mounted Antenna)

Current broadband satcom terminals based on ARINC 791 are using a Line Replaceable Unit (LRU) named APM (Aircraft Personality Module), which works in conjunction of the main system controller LRU, i.e. the MODMAN.

The MODMAN is a component (LRU) part of the Satellite Terminal for Aircraft and is the overall system controller for the whole AES terminal. The MODMAN can be seen as a server hosting and driving the Satellite Modem. The MODMAN
  interfaces with other devices/components (e.g. through Ethernet, ARINC 429, etc.),
  hosts a CPU, RAM, storage,
  integrates one or more satcom modems (normally supplied by commercial satcom modem vendors).

The design of the MODMAN is dictated by both ARINC 791 and 792 Standards, namely its
  Envelope/Size: 4-MCU, defined by the ARINC600 standard,
  Location: airplane equipment rack in the Electronic-ebay,
  Power Consumption: 100 W max., active cooling present in the E-ebay, not in the LRU,
  Weight: 10 kg max.

The APM is wired to the MODMAN according to ARINC 791.

The APM (Aircraft Personality Module):
  provides a location for retaining Satcom System configuration information that is specific to each aircraft installation,
  remains with the aircraft whenever the MODMAN is changed, and thereby facilitates the swapping of a MODMAN without the need to reload configuration parameters, installation calibration parameters, and any other installation-specific information.
  Additionally, the MODMAN controls communication with the APM, and takes care of reading/writing information from/on the APM.

Details on the functionalities of the APM are described in Attachment 11 of ARINC 791.

Sources:
  ARINC 791: Ku-Band and Ka-Band Satellite Communication System
  ARINC 792: Second-Generation Ku-Band and Ka-Band Satellite Communication System
  ARINC 600: Air Transport Avionic Equipment Interfaces
  RTCA DO-178C: Software Considerations in Airborne Systems and Equipment Certification FIG. 4 shows a prior art broadband satellite terminal according to the ARINC 792 standard. ARINC792 evolved the architecture of ARINC791, mainly to accommodate phased-array antennas (where HPA, up and down conversion are normally integrated on the antenna panels).

The ARINC792 AES system in FIG. 4 comprises 4 Line-Replaceable Units (LRUs), namely
  RX antenna
  TX antenna
  KPSU (Ku/Ka-band Power Supply Unit)
  MODMAN ARINC 792 allows the possibility for the APM to become "virtual". Terminals based on the ARINC 791 architecture have been designed, implemented, and used for some years. After the experience from these commercial products, it was recognized that designing and maintaining extra hardware for the APM was not strictly necessary. So, ARINC 792 offered different other options, to save the effort and costs of an extra LRU to host the APM functions.

The prior-art options mentioned by the ARINC 792 to implement the APM functions are the following ones:
  A physical, small, dedicated dongle: ARINC 792 is not mandating a specific form factor or interface to MODMAN and leaves freedom to hardware designs;
  Virtual/software (SW): copies of the APM contents are distributed over multiple LRUs.

However, the following problems remain with MODMANs and APMs both according to the ARINC791 and ARINC 792 standards:
  If a MODMAN becomes faulty and needs replacement, in both prior art designs the APM unit has to be physically (or virtually) disconnected from the defective MODMAN which has to be replaced by a new working MODMAN, i.e., complicated and error-prone replacement steps have to be performed in order to properly disconnect an APM from the defective MODMAN and connect it to the new working MODMAN.

The disconnection of the APM from the faulty MODMAN and its reconnection to the new working MODMAN involve SW operations and complex SW algorithms, to manage redundant, distributed copies of the APM data across different units (mainly associated with the prior-art variant of a virtual APM). On the other hand, the other prior-art variant of the APM as a dongle requires extra mechanical hardware structures around the MODMAN and the MODMAN tray (see in particular ARINC 792 Attachment 5, sec. 5.3), and expensive and delicate aeronautical connectors dedicated to the APM wiring (e.g., a D38999 connector, see in particular ARINC 791 Attachment 11 sec. 11.2.2, and ARINC 792 Attachment 4, sec. 4.9.5).

It is therefore an objective of the present disclosure to provide a MODMAN that is designed to provide the possibility to easily connect to and disconnect from some form of external memory or media which may then act as APM.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The above objective is achieved by a MODMAN into which a media interface slot is integrated which is exclusively dedicated to interface an external storage device which is attachable to and removable from said dedicated media interface slot and wherein said dedicated media interface slot is configured to allow transfer and storage of APM specific via said dedicated media interface slot onto a mounted external storage device which when interacting with the MODMAN via the dedicated media interface slot is configurable to act as dedicated APM in an aviation broadband satellite terminal.

In an embodiment of such a MODMAN according to the present disclosure, a dedicated media interface slot is integrated into a front panel of said MODMAN.

The media interface slot on the MODMAN can be a provision for different types of standard media (e.g. USB, Compact Flash, M.2, etc.). In an embodiment the present disclosure provides the use of an SD card slot on a MODMAN for APM functions.

Normally the MODMAN may have more than one "media slot", but only one of these slots shall be used exclusively for the APM. The reason is that the APM media (e.g., SD card) will be delivered to the customer with some data and contents pre-stored on it. These data are part of the software and configuration files to be used in the AES, which is a certified software and normally it is not a User Modifiable Software, i.e., one part of the APM contents is non-UMS software (according to the RTCA DO-178C definition of UMS).

Other MODMAN media slots (cf. FIG. 2) may be meant to receive different other types of files, e.g.:
just contents (e.g. In-Flight Entertainment (IFE) contents like movies),
UMS software (e.g., customer applications)
other type of non-UMS software, but different from APM data (e.g. software for other LRUs in the AES system).

Accordingly, it is not possible, or desirable, to mix these data and files with the APM contents and files. So, the APM data shall be exchanged exclusively via one media slot and no other types of data shall be exchanged via that media slot.

The requirements on APM content redundancy, robustness, and integrity, and other technical requirements on the APM operations and functions coming from ARINC 791/792 (esp. from Attachment 11 of ARINC 791) can be easily fulfilled with an SD card implementation of the APM, and with best practice and state of the art solutions.

The operations of reading and writing data from/to the APM memory shall be carefully controlled by the MODMAN for airworthiness and certification purposes. One part of the APM data belongs to the airworthiness certification software delivered to the airplane and thus they shall be maintained untouched, as released to the customer; this is typically a non User Modifiable Software (UMS), according to the RTCA DO-178C definition of UMS. These APM data can be calculated and prepared prior to the installation of the AES LRUs on the airplane and are static (they do not change during the life of the AES); these pre-configured data include e.g., AES IP network setup, satellite antenna blockage map, the formatting of the information received from the airplane for the antenna pointing. So, the static part of the APM contents is a non-UMS piece of software.

Another part of the APM data can only be calculated, measured, or entered after the AES system is installed. These latter data are stored on the APM memory and kept there in case the MODMAN or other LRUs in the system are swapped (these data include e.g., antenna alignment data, cable calibration, airplane identification number). These data are non-static in the sense that they have to be updated after the installation of the AES and cannot be calculated and prepared before.

For this reason, it is particularly preferable if the APM storage space is separable into two parts:
static data, pre-configured before APM data release (needed for airworthiness certification),
non-static data, retrieved after hardware installation in the aircraft.

There may different possibilities to realize this separation: different files, folders, partitions. In an embodiment of the disclosed subject matter, an external media storage device (e.g., an SD card) could be mounted on the MODMAN with two partitions: the partition with the static, pre-configured data as read-only, and the partition with non-static data as read/write. This concept is schematically shown in FIG. 2.

Two embodiments of the present disclosure relate to the use of the SD card as "APM"
1. In case the MODMAN needs to be replaced because it is faulty, the SD card can be easily removed from the old MODMAN and inserted into the new one.
2. The operations of reading and writing data from/to the APM memory (e.g., SD card) shall be carefully controlled by the MODMAN for airworthiness and certification purposes:
the static APM data, which are part of the certification software, could be optionally stored on a read-only partition of the SD card;
the non-static APM configuration data, which can only be calculated, measured, or entered after the AES system is installed, could be stored on a read/write partition of the SD card.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
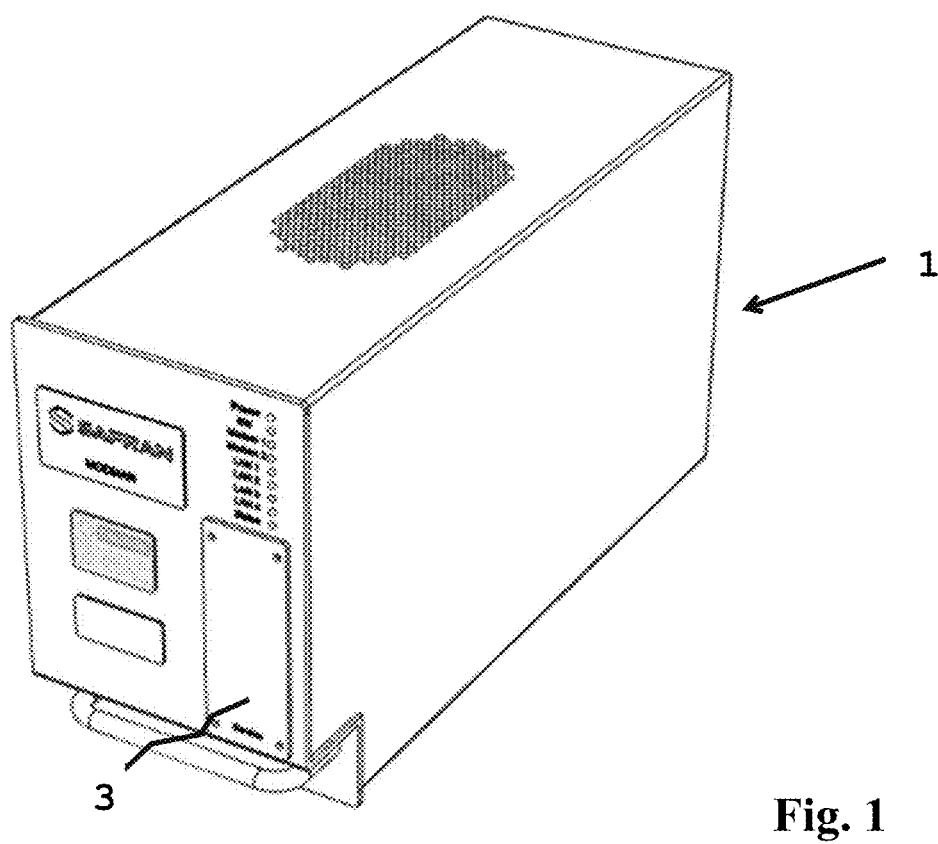
FIG. 1 shows an example of a MODMAN 3D model with a front panel port.
Figure 2:
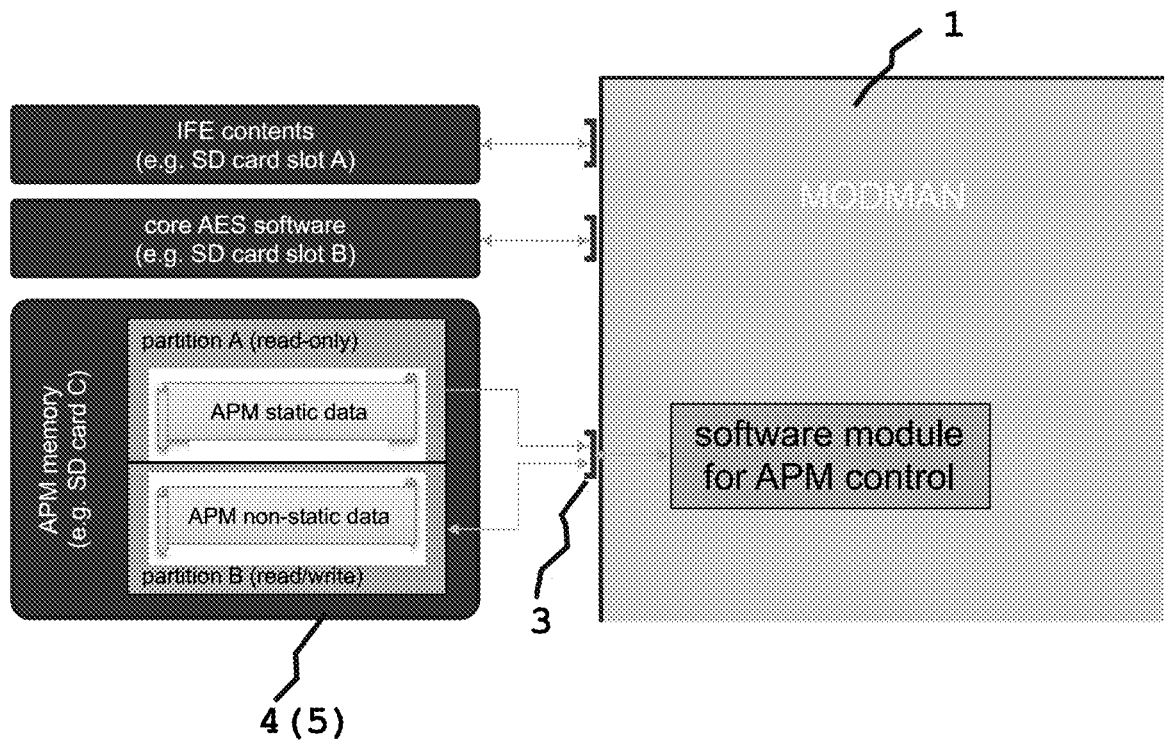
FIG. 2 shows an example of a software architecture designed to manage APM data on an SD card in accordance with an embodiment of the present disclosure.
Figure 3:
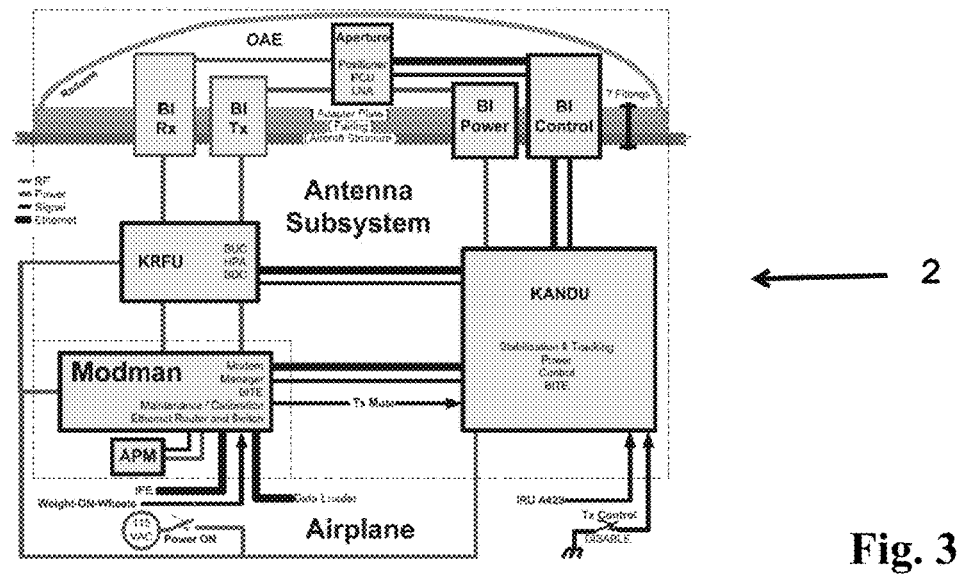
FIG. 3 shows a schematic view of a prior art ARINC 791 broadband satellite terminal.
Figure 4:
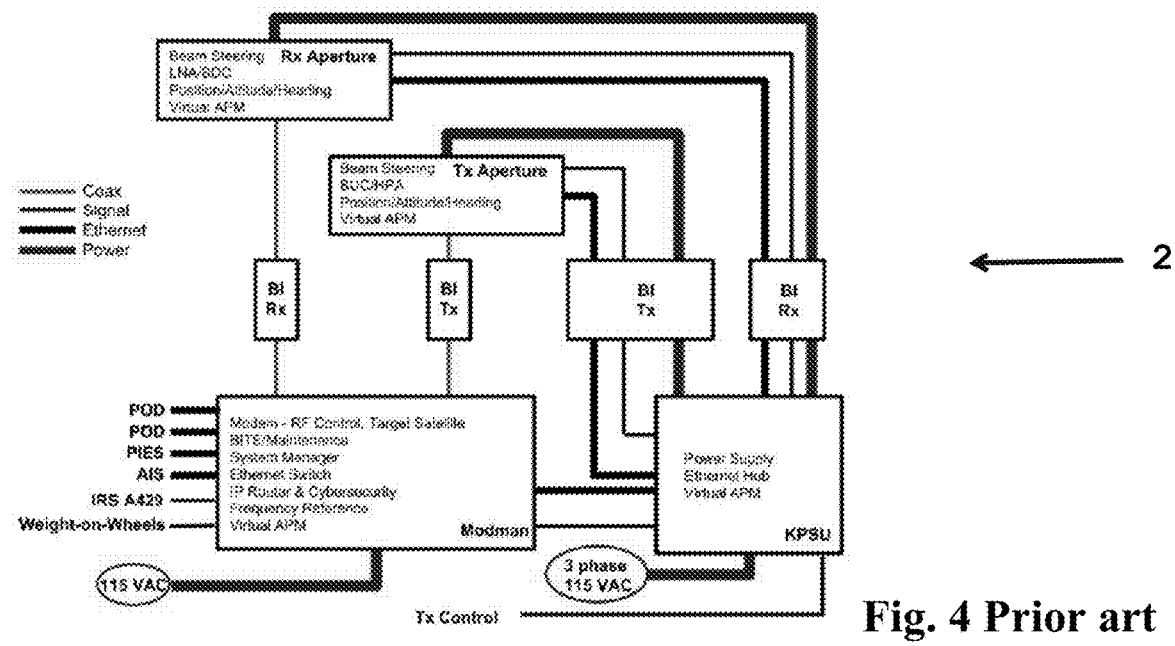
FIG. 4 shows a schematic view of a prior art ARINC 792 broadband satellite terminal.
Figure 5:
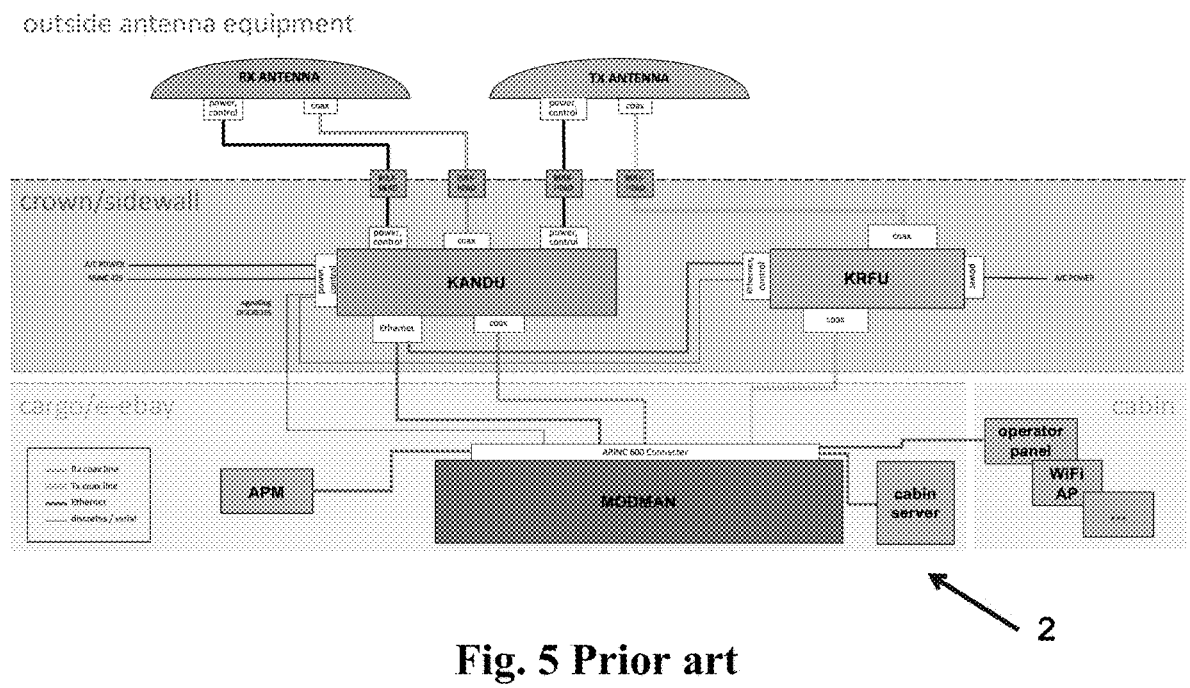
FIG. 5 shows a schematic view of a proprietary prior art AES broadband satellite terminal slightly deviating from the ARINC 791 or ARINC 792 architectures shown in FIGS. 3 and 4.

FIG. 1 shows an example of a MODMAN 3D model with a housing and a with a front panel port. SD card slots may be attached to or removed from a media interface slot 3 inside the front panel door.

As already mentioned above, according to the present disclosure, the dedicated media slot 3 on the MODMAN front panel can be a provision for different types of media (e.g., USB, Compact Flash, M.2, etc.). The SD card is particularly interesting, because of its simplicity, spread, cheapness, and ease of associated SW and hardware design, but in principle any other type of a mountable and removable external storage device could be used in the disclosed subject matter in order to obtain the functionality of "APM data/functions on a removal storage medium".

The architecture of the current broadband satcom terminals following the ARINC 791 standard is based on a core control unit named MODMAN. The MODMAN needs to store some configuration data on a unit/module named APM, which works in conjunction with the MODMAN. The APM basically provides a location for retaining Satcom System configuration information that is specific to the aircraft installation. According to the present disclosure the APM data and functionalities are implemented on an external mountable and removable storage medium plugged directly to the front panel of the MODMAN.

The disclosed subject matter helps to implement the functions that by the ARINC 791 standard were foreseen for the APM hardware module, without the need of an extra hardware unit and with a simple software architecture.

The APM data/functions can be implemented on a removal storage medium, controlled by a software module inside the MODMAN.

The disclosed subject matter leads to the further advantage that any extra hardware and SW implementation needed is very simple, since standard consumer electronics storage media (e.g. SD cards)
media slot and drivers on the MODMAN,
existing software modules on the MODMAN.
may be used.

The solution avoids complex mechanical structures around the MODMAN and the MODMAN tray, and complex SW algorithms, to manage redundant, distributed copies of the APM data across different units.

While illustrative embodiments have been illustrated and described, it will be appreciated that various changes can be made therein without departing from the spirit and scope of the present disclosure.

The embodiments of the disclosed subject matter in which an exclusive property or privilege is claimed are defined as follows:

1. A MODMAN (Modem Manager) unit configured to be used in an aviation broadband satellite terminal, the MODMAN (Modem Manager) comprising:
a software module configured to control APM (Aircraft Personality Module) data and functions; and
a dedicated media interface slot, configured to have an external storage device demountably coupled thereto, wherein the external storage device is configured to act as a dedicated APM (Aircraft Personality Module), the external storage device being in operative communication with the software module when the external storage device is mounted to the dedicated media interface slot, wherein the external storage device comprises a first partition storing static, pre-configured APM data and a second partition storing non-static APM data, and wherein the MODMAN is configured to restrict write access to the first partition to maintain airworthiness certification compliance, and only instructions and data specific for the APM (Aircraft Personality Module) are transferred through the dedicated media interface slot, and wherein the MODMAN (Modem Manager) is configured to interact via the dedicated media interface slot with said dedicated APM (Aircraft Personality Module) to be used in an aviation broadband satellite terminal.

2. The MODMAN (Modem Manager) according to claim 1, wherein said dedicated media interface slot is integrated into a front panel of said MODMAN (Modem Manager).

3. The MODMAN (Modem Manager) according to claim 1, wherein said dedicated media interface slot is configured to interface with a standard consumer electronics SD secure digital memory card which is configurable to act as an APM (Aircraft Personality Module).

4. A system for an aviation broadband satellite terminal, comprising:
an external storage device; and
a MODMAN (Modem Manager), comprising:
a software module configured to control APM (Aircraft Personality Module) data and functions; and
a dedicated media interface slot configured to have the external storage device demountably coupled thereto, wherein the external storage device is in operative communication with the software module when the external storage device is mounted to the dedicated media interface slot, wherein the external storage device comprises a first partition storing static, pre-configured APM data and a second partition storing non-static APM data, and wherein the MODMAN is configured to restrict write access to the first partition to maintain airworthiness certification compliance, and only instructions and data specific for an APM (Aircraft Personality Module) is transferred through the dedicated media interface slot, and wherein the MODMAN (Modem Manager) is configured to interact via the dedicated media interface slot with said dedicated APM (Aircraft Personality Module),
wherein the external storage device is configured to be demountably coupled to the dedicated media interface slot of a MODMAN (Modem Manager), wherein said external storage device is configurable to act as an APM (Aircraft Personality Module) via said dedicated media interface slot of said MODMAN (Modem Manager).

5. The system according to claim 4, wherein said external storage device is a secure digital memory SD card.

6. The system according to claim 4, wherein said external storage device is configured with a first partition with static, pre-configured data as read-only partition, and a second partition for non-static data as read/write partition.

7. A system for an aviation broadband satellite terminal comprising a MODMAN (Modem Manager), the MODMAN (Modem Manager), comprising:
- a software module configured to control APM (Aircraft Personality Module) data and functions; and
- a dedicated media interface slot configured to have an external storage device demountably coupled thereto, wherein the external storage device is in operative communication with the software module when the external storage device is mounted to the dedicated media interface slot, wherein the external storage device comprises a first partition storing static, pre-configured APM data and a second partition storing non-static APM data, and wherein the MODMAN is configured to restrict write access to the first partition to maintain airworthiness certification compliance, and only instructions and data specific for an APM (Aircraft Personality Module) is transferred through the dedicated media interface slot and wherein the MODMAN (Modem Manager) is configured to interact via the dedicated media interface slot with said dedicated APM (Aircraft Personality Module) to be used in an aviation broadband satellite terminal.

8. The system according to claim 7, further comprising an external storage device, wherein the external storage device is configured to be demountably coupled to the dedicated media interface slot of a MODMAN (Modem Manager), and the external storage device is configurable to act as an APM (Aircraft Personality Module) via said media interface slot of said MODMAN (Modem Manager).

* * * * *